US010525561B2

(12) United States Patent
Ono

(10) Patent No.: US 10,525,561 B2
(45) Date of Patent: Jan. 7, 2020

(54) CONTROL DEVICE FOR WORKING DEVICE, WORKING DEVICE, CONTROL PROGRAM FOR WORKING DEVICE, CONTROL METHOD FOR WORKING DEVICE, AND WORKING METHOD

(71) Applicant: MITSUBISHI HEAVY INDUSTRIES, LTD., Minato-ku, Tokkyo (JP)

(72) Inventor: Yuji Ono, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 630 days.

(21) Appl. No.: 14/650,137

(22) PCT Filed: Dec. 19, 2013

(86) PCT No.: PCT/JP2013/084027
§ 371 (c)(1),
(2) Date: Jun. 5, 2015

(87) PCT Pub. No.: WO2014/098172
PCT Pub. Date: Jun. 26, 2014

(65) Prior Publication Data
US 2015/0306720 A1 Oct. 29, 2015

(30) Foreign Application Priority Data
Dec. 20, 2012 (JP) .................................. 2012-277911

(51) Int. Cl.
*B23Q 15/12* (2006.01)
*G05B 19/404* (2006.01)

(52) U.S. Cl.
CPC ........... *B23Q 15/12* (2013.01); *G05B 19/404* (2013.01); *G05B 2219/37435* (2013.01)

(58) Field of Classification Search
CPC .... B23Q 15/12; B23Q 17/0976; B23Q 17/12; B23Q 11/0039; G05B 19/404;
(Continued)

(56) References Cited

U.S. PATENT DOCUMENTS 4,047,469 A * 9/1977 Sakata ............... B23Q 11/0039
408/143
6,507,165 B2 * 1/2003 Kato ...................... B25J 9/1641
318/568.22
(Continued)

FOREIGN PATENT DOCUMENTS

JP 2000-143022 A 5/2000
JP 2007-44852 A 2/2007
(Continued)

OTHER PUBLICATIONS

Japan Patent Office, "Decision to Grant a Patent for Japanese Patent Application No. 2012-277911," dated Sep. 6, 2016.
(Continued)

*Primary Examiner* — Robert E Fennema
*Assistant Examiner* — Santosh R Poudel
(74) *Attorney, Agent, or Firm* — Manabu Kanesaka; Benjamin Hauptman; Kenneth Berner

(57) ABSTRACT

An NC unit calculates the phase difference in chatter vibration during working on the basis of detection result of sound produced by working a workpiece by an end mill, increases the number of rotations of the end mill by a predetermined number if the phase difference is smaller than a first phase difference threshold, and decreases the number of rotations of the end mill by a predetermined number if the phase difference is larger than a second phase difference threshold. Further, if the phase difference is between the first phase difference threshold and the second phase difference threshold, the NC unit finds the resonance frequency of a machine
(Continued)

tool by multiplying a chatter frequency by a correction factor that changes according to the chatter frequency, and calculates the number of rotations of the end mill on the basis of the resonance frequency, to obtain stable working with suppressed chatter vibration.

12 Claims, 10 Drawing Sheets

(58) Field of Classification Search
CPC ...... G05B 19/4163; G05B 2219/37435; G05B 2219/34047; G05B 2219/37434; G05B 2219/37493; G05B 2219/41256; F25J 2205/32; F25J 2230/02; F25J 3/04018; F25J 3/04303; F25J 3/04412; F25J 3/04672; F25J 3/04739; Y10T 409/303752; Y10T 409/304312
See application file for complete search history.

(56) References Cited

U.S. PATENT DOCUMENTS

| | | | | |
|---|---|---|---|---|
| 2010/0010662 A1* | 1/2010 | Inagaki | ............. | B23Q 17/0976 700/175 |
| 2010/0104388 A1* | 4/2010 | Suzuki | ............... | B23Q 11/0039 409/131 |
| 2013/0164092 A1* | 6/2013 | Kondo | ................ | G05B 19/404 409/132 |

FOREIGN PATENT DOCUMENTS

| | | | |
|---|---|---|---|
| JP | 2009-291872 A | 12/2009 | |
| JP | 2010-017783 A | 1/2010 | |
| JP | 2010-105073 A | 5/2010 | |
| JP | 2010-105160 A | 5/2010 | |
| JP | 2010-125570 A | 6/2010 | |
| JP | 2010-247316 A | 11/2010 | |
| JP | 2012-091249 A | 5/2012 | |
| JP | 2012-171058 A | 9/2012 | |
| JP | 2012-196741 A | 10/2012 | |
| JP | 2012-206230 A | 10/2012 | |
| WO | WO/2012/032811 | * 3/2012 | ............ G06F 17/00 |

OTHER PUBLICATIONS

PCT/ISA/210, "International Search Report for International Application No. PCT/JP2013/084027," dated Apr. 8, 2014.
PCT/ISA/237, "Written Opinion of the International Searching Authority for International Application No. PCT/JP2013/084027," dated Apr. 8, 2014.
Morita, H. et al., "Tracing and Visualizing Variation of Chatter for In-process Identification of Preferred Spindle Speeds," SciVerse Science Direct, 2012, p. 11-16, Procedia CIRP 4, 3rd CIRP Conference on Process Machine Interactions (3rd PMI), Elsevier B. V. Selection.
Shamoto, E., "Mechanism and Suppression of Chatter Vibrations in Cutting," Denki-Seiko Electric Furnace Steel, 2011, p. 143-155, vol. 82, No. 2, Daido Corporate Research & Development Center, Daido Steel Co., Ltd.

* cited by examiner

CONTROL DEVICE FOR WORKING DEVICE, WORKING DEVICE, CONTROL PROGRAM FOR WORKING DEVICE, CONTROL METHOD FOR WORKING DEVICE, AND WORKING METHOD

RELATED APPLICATIONS

The present application is National Phase of International Application No. PCT/JP2013/084027 filed Dec. 19, 2013, and claims priority from Japanese Application No. 2012-277911, filed Dec. 20, 2012, the disclosure of which is hereby incorporated by reference herein in its entirety.

TECHNICAL FIELD

The present invention relates to an NC unit for a machine tool, a machine tool, a control program for a machine tool, a control method for a machine tool, and a working method.

BACKGROUND ART

If chatter vibration which is a type of self-excited vibration occurs in a case where a workpiece is being worked by the rotation of a tool, the surface roughness and the external appearance of a worked surface are degraded, and thus hand finishing work is required for the degraded place. In addition, the working is, for example, cutting.

In the related art, as a method of suppressing such chatter vibration of a machine tool, there is a method of determining the number of rotations of a tool in which it is difficult for chatter vibration to occur, by finding a transfer function of a system in which chatter vibration occurs, which includes the tool or a workpiece, by an impulse response test, calculating convergence and divergence of the chatter vibration occurring during working in a range of a cut depth at the time of working or the number of rotations of the tool, and determining a stability limit line diagram.

Further, as stated in PTL 1, there is also a method of suppressing chatter vibration by performing working by using the number of rotations in which a chatter frequency during working of a system in which chatter vibration occurs is calculated by Equation (1) below, as a stable rotation speed.

[Equation 1]

$$\text{Stable rotation speed} = \frac{fc \times 60}{Z \times K} \quad (1)$$

In addition, fc is a chatter frequency, Z is the number of cutting teeth of a tool, and K is an integer.

CITATION LIST

Patent Literature

[PTL 1] Japanese Unexamined Patent Application Publication No. 2010-247316

SUMMARY OF INVENTION

Technical Problem

However, a method of finding a transfer function by an impulse response test is performed with a tool stopped, and therefore, there is a difference between the obtained transfer function and a transfer function at the time of the rotation of the tool or the time of working, and thus the obtained stability limit line diagram is also different from that at the time of working.

Further, in a method of calculating a stable rotation speed from a chatter frequency, since there is a difference between a chatter frequency and a resonance frequency (a natural frequency) of the entire machine tool, it is not possible to calculate the optimum rotation speed which does not necessarily cause chatter vibration.

The present invention has been made in view of such circumstances and has an object to provide an NC unit for a machine tool, a machine tool, a control program for a machine tool, a control method for a machine tool, and a working method, which enable stable working with suppressed chatter vibration when working a workpiece by rotation of a tool.

Solution to Problem

In order to solve the above-described problem, an NC unit for a machine tool, a machine tool, a control program for a machine tool, a control method for a machine tool, and a working method according to the present invention adopt the following means.

According to a first aspect of the present invention, there is provided an NC unit for a machine tool that works a workpiece by rotation of a tool, including: vibration detection means for detecting vibration which is generated by working of the workpiece; acquisition means for acquiring a physical quantity correlated with a phase difference of chatter vibration during working, on the basis of a detection result of the vibration by the vibration detection means; spindle speed calculation means for finding a resonance frequency of the machine tool by multiplying the physical quantity by a correction factor that changes according to the physical quantity acquired by the acquisition means, and calculating the number of rotations of the tool on the basis of the resonance frequency; and spindle speed control means for rotating the tool at a spindle speed calculated by the spindle speed calculation means.

According to this configuration, in the machine tool that works a workpiece by rotation of a tool, vibration which is generated by the working of the workpiece is detected by the vibration detection means.

The vibration which is generated by the working of the workpiece is correlated with a phase difference of chatter vibration during working. The phase difference of chatter vibration during working is namely a difference between a phase of chatter vibration during the previous time working and a phase of chatter vibration during this time working.

Depending on the size of the phase difference of the chatter vibration during working, stable working is hindered. In order to perform stable working, it is desirable that the number of rotations of the tool is the number of rotations according to a resonance frequency of the entire machine tool.

Therefore, a physical quantity correlated with the phase difference of the chatter vibration during working is acquired by the acquisition means on the basis of the detection result of the vibration by the vibration detection means.

Then, by the spindle speed calculation means, a resonance frequency of the machine tool is found by multiplying the physical quantity by a correction factor that changes according to the acquired physical quantity and the number of rotations of the tool is calculated on the basis of the resonance frequency. That is, the correction factor is a value for obtaining the resonance frequency of the machine tool by multiplying the acquired physical quantity by it. In addition, the correction factor is obtained in advance. In this way, the number of rotations of the tool for performing stable working is calculated. Then, the spindle speed control means rotates the tool at a spindle speed calculated by the spindle speed calculation means.

Therefore, this configuration enables stable working with suppressed chatter vibration when working the workpiece by the rotation of the tool.

In the first aspect, it is preferable that the vibration detection means is sound detection means for detecting sound which is generated by the working of the workpiece, or acceleration detection means for detecting rotational acceleration of the tool.

According to this configuration, the vibration which is generated by the working of the workpiece can be detected.

In the first aspect, it is preferable that the detection result of the sound by the sound detection means is a frequency or a sound pressure level of the sound.

The frequency or the sound pressure level of the sound detected by the sound detection means is correlated with the phase difference of the chatter vibration during working. For this reason, according to this configuration, the correction factor can be simply calculated.

In the first aspect, it is preferable that the NC unit further includes phase difference calculation means for calculating a phase difference of chatter vibration during working on the basis of the detection result of the sound by the sound detection means and the spindle speed calculation means calculates the number of rotations of the tool by increasing the number of rotations of the tool by a first predetermined number in a case where the phase difference is smaller than a predetermined first threshold, decreasing the number of rotations of the tool by a second predetermined number in a case where the phase difference is greater than a second threshold greater than the first threshold, and multiplying the physical quantity by the correction factor in a case where the phase difference is between the first threshold and the second threshold.

The more a case where the phase difference is small so as to be close to 0 or a case where the phase difference is large so as to be close to 1, the more the number of rotations of the tool is close to the number of rotations according to the resonance frequency, and thus stable working becomes possible.

In this configuration, the phase difference of the chatter vibration during working is calculated by the phase difference calculation means on the basis of the detection result by the sound detection means.

Then, in a case where the calculated phase difference is smaller than the first threshold, the number of rotations of the tool is increased by the first predetermined number. Further, in a case where the phase difference is greater than the second threshold, the number of rotations of the tool is decreased by the second predetermined number. In addition, the first predetermined number and the second predetermined number may be the same value or may be different values. A case where the phase difference is smaller than the first threshold is a case where the phase difference is close to 0, and the number of rotations of the tool is increased, thereby becoming close to the number of rotations according to the resonance frequency. In contrast, a case where the phase difference is greater than the second threshold is a case where the phase difference is close to 1, and the number of rotations of the tool is decreased, thereby becoming close to the number of rotations according to the resonance frequency.

Therefore, this configuration enables stable working with more suppressed chatter vibration when working the workpiece by the rotation of the tool.

According to a second aspect of the present invention, there is provided an NC unit for a machine tool that works a workpiece by rotation of a tool, including: vibration detection means for detecting vibration which is generated by working of the workpiece; phase difference calculation means for calculating a phase difference of chatter vibration during working on the basis of a detection result of the vibration by the vibration detection means; spindle speed calculation means for increasing the number of rotations of the tool by a predetermined number in a case where the phase difference calculated by the phase difference calculation means is smaller than a predetermined threshold, and decreasing the number of rotations of the tool by a predetermined number in a case where the phase difference is greater than the threshold; and spindle speed control means for rotating the tool at a spindle speed calculated by the spindle speed calculation means.

According to this configuration, in the machine tool that works a workpiece by the rotation of a tool, vibration which is generated by the working of the workpiece is detected by the vibration detection means.

The vibration, for example, the sound or the rotational acceleration, which is generated by the working of the workpiece is correlated with the phase difference of chatter vibration during working. The phase difference of chatter vibration during working is namely a difference between the phase of chatter vibration during the previous time working and the phase of chatter vibration during this time working. In addition, the phase difference as referred to herein refers to only a decimal part in a case where the phase difference is expressed by an integer and a decimal.

Depending on the size of the phase difference of the chatter vibration during working, stable working is hindered. In order to perform stable working, it is desirable that the number of rotations of the tool is the number of rotations according to a resonance frequency of the entire machine tool. The more a case where the phase difference is small so as to be close to 0 or a case where the phase difference is large so as to be close to 1 ($2\pi$), the more the number of rotations of the tool is close to the number of rotations according to the resonance frequency, and thus stable working becomes possible.

Therefore, the phase difference of chatter vibration during working is calculated by the phase difference calculation means on the basis of the detection result by the vibration detection means. Then, the spindle speed calculation means increases the number of rotations of the tool by a predetermined number in a case where the calculated phase difference is smaller than a predetermined threshold, and decreases the number of rotations of the tool by a predetermined number in a case where the phase difference is greater than the threshold.

A case where the phase difference is smaller than the threshold is a case where the phase difference is close to 0, and the number of rotations of the tool is increased, thereby becoming close to the number of rotations according to the resonance frequency. In contrast, a case where the phase difference is greater than the threshold is a case where the phase difference is close to 1, and the number of rotations of the tool is decreased, thereby becoming close to the number of rotations according to the resonance frequency. Then, the spindle speed control means rotates the tool at a spindle speed calculated by the spindle speed calculation means.

Therefore, in this configuration, when working the workpiece by the rotation of the tool, stable working with suppressed chatter vibration becomes possible.

In the second aspect, it is preferable that the threshold is different for each integer part of the phase difference.

If the integer part of the phase difference is different, the minimum value and the maximum value of the decimal part of the phase difference are also different. For this reason, in this configuration, since the threshold is varied for each integer part of the phase difference, it is possible to make the number of rotations of the tool the number of rotations according to the resonance frequency of the entire machine tool, with high accuracy.

In the second aspect, it is preferable that as the threshold, a first threshold and a second threshold greater than the first threshold are set and the spindle speed calculation means increases the number of rotations of the tool by a first predetermined number in a case where the phase difference calculated by the phase difference calculation means is smaller than the first threshold, and decreases the number of rotations of the tool by a second predetermined number in a case where the phase difference is greater than the second threshold.

According to this configuration, as the threshold, the first threshold and the second threshold greater than the first threshold are set.

Then, in a case where the calculated phase difference is smaller than the first threshold, the number of rotations of the tool is increased by the first predetermined number. Further, in a case where the phase difference is greater than the second threshold, the number of rotations of the tool is decreased by the second predetermined number. In addition, the first predetermined number and the second predetermined number may be the same value or may be different values.

A case where the phase difference is smaller than the first threshold is a case where the phase difference is close to 0, and the number of rotations of the tool is increased, thereby becoming close to the number of rotations according to the resonance frequency. In contrast, a case where the phase difference is greater than the second threshold is a case where the phase difference is close to 1, and the number of rotations of the tool is decreased, thereby becoming close to the number of rotations according to the resonance frequency.

Therefore, in this configuration, it is possible to make the number of rotations of the tool the number of rotations according to the resonance frequency of the entire machine tool, with high accuracy.

In the second aspect, it is preferable that the spindle speed calculation means fixes the number of rotations of the tool to the number of rotations in a case where the number of rotations of the tool is greater than the second threshold and thus the number of rotations of the tool is decreased by the second predetermined number, and as a result, the number of rotations of the tool has become smaller than the first threshold.

A case where the number of rotations of the tool becomes smaller than the first threshold after the number of rotations of the tool is decreased by the second predetermined number is a case where the integer part of the phase difference has changed. In such a case, if the number of rotations of the tool is increased by the first predetermined number again, the integer part of the phase difference changes again, and thus the phase difference becomes greater than the second threshold, and the number of rotations is frequently switched, and thus there is a possibility that control may become unstable. Further, the smaller the phase difference, the smaller, for example, sound pressure due to the chatter vibration, and the chatter vibration is small, and therefore, it is preferable that the phase difference is small.

Therefore, in this configuration, when working the workpiece by the rotation of the tool, stable working with suppressed chatter vibration becomes possible.

According to a third aspect of the present invention, there is provided a machine tool including: a tool that works a workpiece by rotation; and the NC unit described above.

According to a fourth aspect of the present invention, there is provided a control program for a machine tool that works a workpiece by rotation of a tool and is provided with vibration detection means for detecting vibration which is generated by working of the workpiece, the control program causing a computer to function as acquisition means for acquiring a physical quantity correlated with a phase difference of chatter vibration during working, on the basis of the detection result of the vibration by the vibration detection means, and spindle speed calculation means for finding a resonance frequency of the machine tool by multiplying the physical quantity by a correction factor that changes according to the physical quantity acquired by the acquisition means, and calculating the number of rotations of the tool on the basis of the resonance frequency.

According to a fifth aspect of the present invention, there is provided a control program for a machine tool that works a workpiece by rotation of a tool and is provided with vibration detection means for detecting vibration which is generated by working of the workpiece, the control program causing a computer to function as phase difference calculation means for calculating a phase difference of chatter vibration during working on the basis of the detection result of the vibration by the vibration detection means, and spindle speed calculation means for increasing the number of rotations of the tool by a predetermined number in a case where the phase difference calculated by the phase difference calculation means is smaller than a predetermined threshold, and decreasing the number of rotations of the tool by a predetermined number in a case where the phase difference is greater than the threshold.

According to a sixth aspect of the present invention, there is provided a control method for a machine tool that works a workpiece by rotation of a tool, including: a first process of detecting vibration which is generated by working of the workpiece; a second process of acquiring a physical quantity correlated with a phase difference of chatter vibration during working, on the basis of a detection result of the vibration; a third process of finding a resonance frequency of the machine tool by multiplying the physical quantity by a correction factor that changes according to the acquired physical quantity, and calculating the number of rotations of the tool on the basis of the resonance frequency; and a fourth process of rotating the tool at the calculated number of rotations.

According to a seventh aspect of the present invention, there is provided a control method for a machine tool that works a workpiece by rotation of a tool, including: a first process of detecting vibration which is generated by working of the workpiece; a second process of calculating a phase difference of chatter vibration during working on the basis of a detection result of the vibration; a third process of increasing the number of rotations of the tool by a predetermined number in a case where the calculated phase difference is smaller than a predetermined threshold, and decreasing the number of rotations of the tool by a predetermined number in a case where the phase difference is greater than the threshold; and a fourth process of rotating the tool at the calculated number of rotations.

According to an eighth aspect of the present invention, there is provided a working method of working a workpiece by rotation of a tool, including: a first process of detecting vibration which is generated by working of the workpiece; a second process of acquiring a physical quantity correlated with a phase difference of chatter vibration during working, on the basis of a detection result of the vibration; a third process of finding a resonance frequency of a machine tool by multiplying the physical quantity by a correction factor that changes according to the acquired physical quantity, and calculating the number of rotations of the tool on the basis of the resonance frequency; and a fourth process of working the workpiece by rotating the tool at the calculated number of rotations.

According to a ninth aspect of the present invention, there is provided a working method of working a workpiece by rotation of a tool, including: a first process of detecting vibration which is generated by working of the workpiece; a second process of calculating a phase difference of chatter vibration during working on the basis of a detection result of the vibration; a third process of increasing the number of rotations of the tool by a predetermined number in a case where the calculated phase difference is smaller than a predetermined threshold, and decreasing the number of rotations of the tool by a predetermined number in a case where the phase difference is greater than the threshold; and a fourth process of working the workpiece by rotating the tool at the calculated number of rotations.

Advantageous Effects of Invention

According to the present invention, an excellent effect of enabling stable working with suppressed chatter vibration when working a workpiece by the rotation of a tool is provided.

DESCRIPTION OF EMBODIMENTS

Hereinafter, embodiments of an NC unit for a machine tool, a machine tool, a control program for a machine tool, a control method for a machine tool, and a working method according to the present invention will be described with reference to the drawings.

Figure 1:
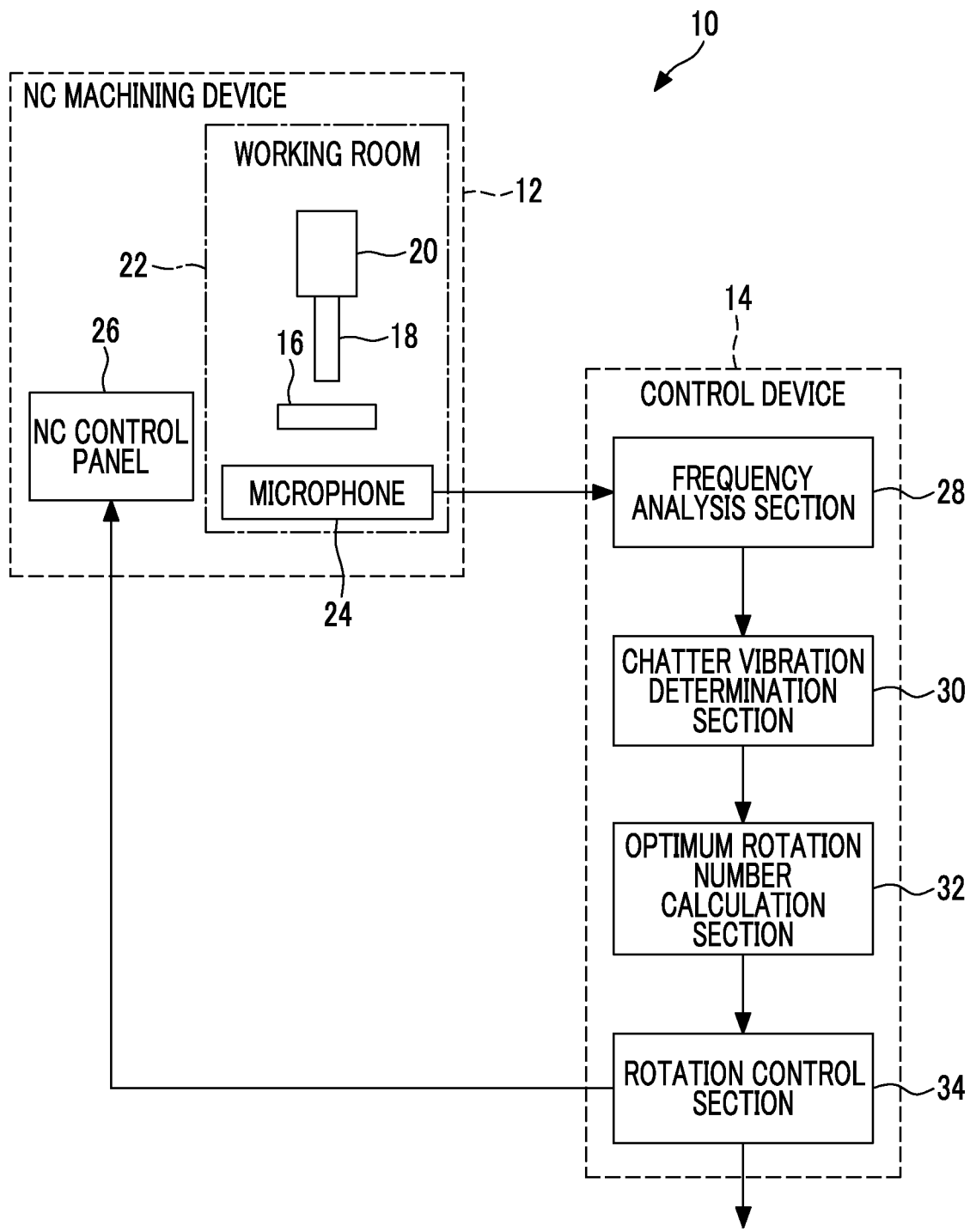
FIG. 1 is a configuration diagram of a machine tool related to an embodiment of the present invention.

FIG. 1 is a block diagram showing the configuration of a machine tool 10 according to this embodiment.

The machine tool 10 is provided with an NC machine tool 12 and an NC unit 14.

The NC machine tool 12 works a workpiece 16 by the rotation of a tool. In addition, in this embodiment, an end mill 18 is used as an example of the tool, and cutting is performing as an example of the working. The end mill 18 rotates by being connected to a main spindle 20.

A microphone 24 which detects sound that is generated by the cutting of the workpiece 16 is provided in a machine inside 22 in which the workpiece 16 is cut by the end mill 18.

The NC unit 14 calculates the number of rotations of the end mill 18 and outputs a control signal indicating the calculated number of rotations to an NC panel 26 provided in the NC machine tool 12. The NC panel 26 rotates the end mill 18 on the basis of the input control signal.

The NC unit 14 is provided with a frequency analysis section 28, a chatter vibration determination section 30, an optimum spindle speed calculation section 32, and a rotation control section 34.

The frequency analysis section 28 analyzes the frequency of a sound signal indicating sound detected by the microphone 24.

The chatter vibration determination section 30 determines whether or not chatter vibration which is a type of self-excited vibration is occurring in the cutting of the workpiece 16, on the basis of a frequency output from the frequency analysis section 28. Further, the chatter vibration determination section 30 acquires a physical quantity correlated with a phase difference of chatter vibration during cutting, on the basis of the detection result of sound by sound detection means. In addition, in this embodiment, the chatter vibration determination section 30 acquires a chatter frequency as the physical quantity.

In addition, the NC unit 14 may calculate a chatter frequency by providing an accelerometer for detecting rotational acceleration of the end mill 18 in the main spindle 20 and performing FFT (Fast Fourier Transform) analysis of the detected acceleration waveform, instead of the analysis of the frequency of sound signal detected by the microphone 24.

The optimum spindle speed calculation section 32 calculates the optimum spindle speed of the end mill 18.

The rotation control section 34 converts a spindle speed calculated by the optimum spindle speed calculation section 32 to a signal for being input to the NC machine tool 12.

In addition, the NC unit 14 is configured with, for example, a CPU (Central Processing Unit), a RAM (Random Access Memory), a computer-readable recording medium, and the like. Then, a series of processing for realizing various functions of the frequency analysis section 28, the chatter vibration determination section 30, the optimum spindle speed calculation section 32, and the rotation control section 34 is recorded on the recording medium or the like in the form of a program as an example, and the CPU reads the program into the RAM or the like and executes the processing and arithmetic processing of information, whereby various functions are realized.

Next, the chatter vibration which is generated in the cutting of the workpiece 16 by the end mill 18 will be described.

Figure 2:
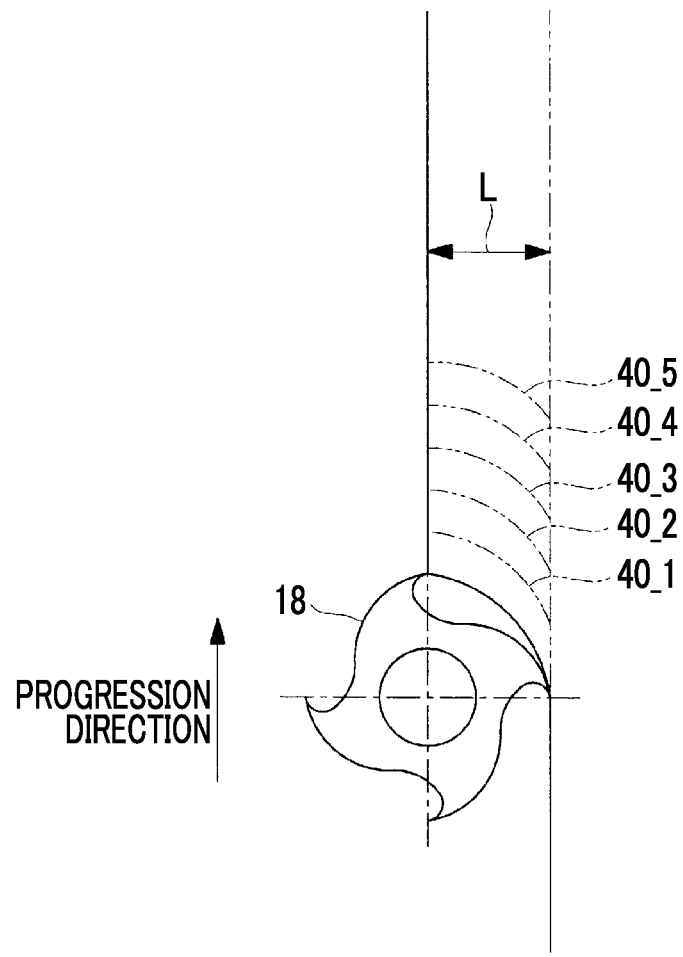
FIG. 2 is a schematic diagram showing the state of cutting of a workpiece by an end mill related to the embodiment of the present invention.

FIG. 2 shows the state of the cutting of the workpiece 16 by the end mill 18. The workpiece 16 is cut at a thickness L in order of worked surfaces 40_1, 40_2, 40_3, 40_4, and 40_5 by the end mill 18.

The end mill 18 cuts the workpiece 16 while vibrating due to reception of a force. For this reason, the vibration is transferred to the workpiece 16. The force which the end mill 18 receives is proportional to a thickness at which the workpiece 16 is cut.

Figure 3:
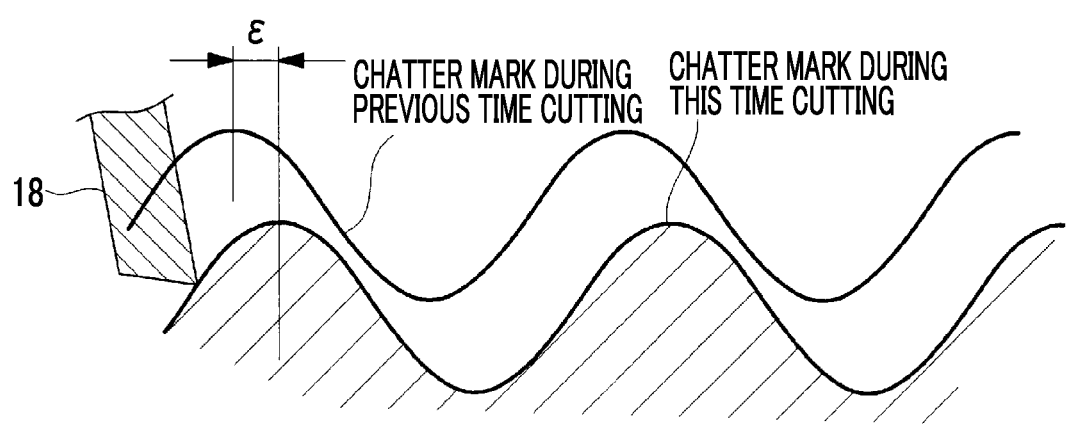
FIG. 3 is a schematic diagram of a worked surface by the end mill related to the embodiment of the present invention.

Due to the influence of the vibration of the end mill 18, there is a case where a worked surface 40 is undulated, as shown in FIG. 3. Then, a difference between a chatter mark during the previous time cutting and a chatter mark during this time cutting, that is, a difference between a chatter frequency during the previous time cutting and a chatter frequency during this time cutting, occurs as a phase difference E. In addition, FIG. 3 is a diagram showing the curved worked surface 40 in FIG. 2 in a linear fashion.

Figure 4:
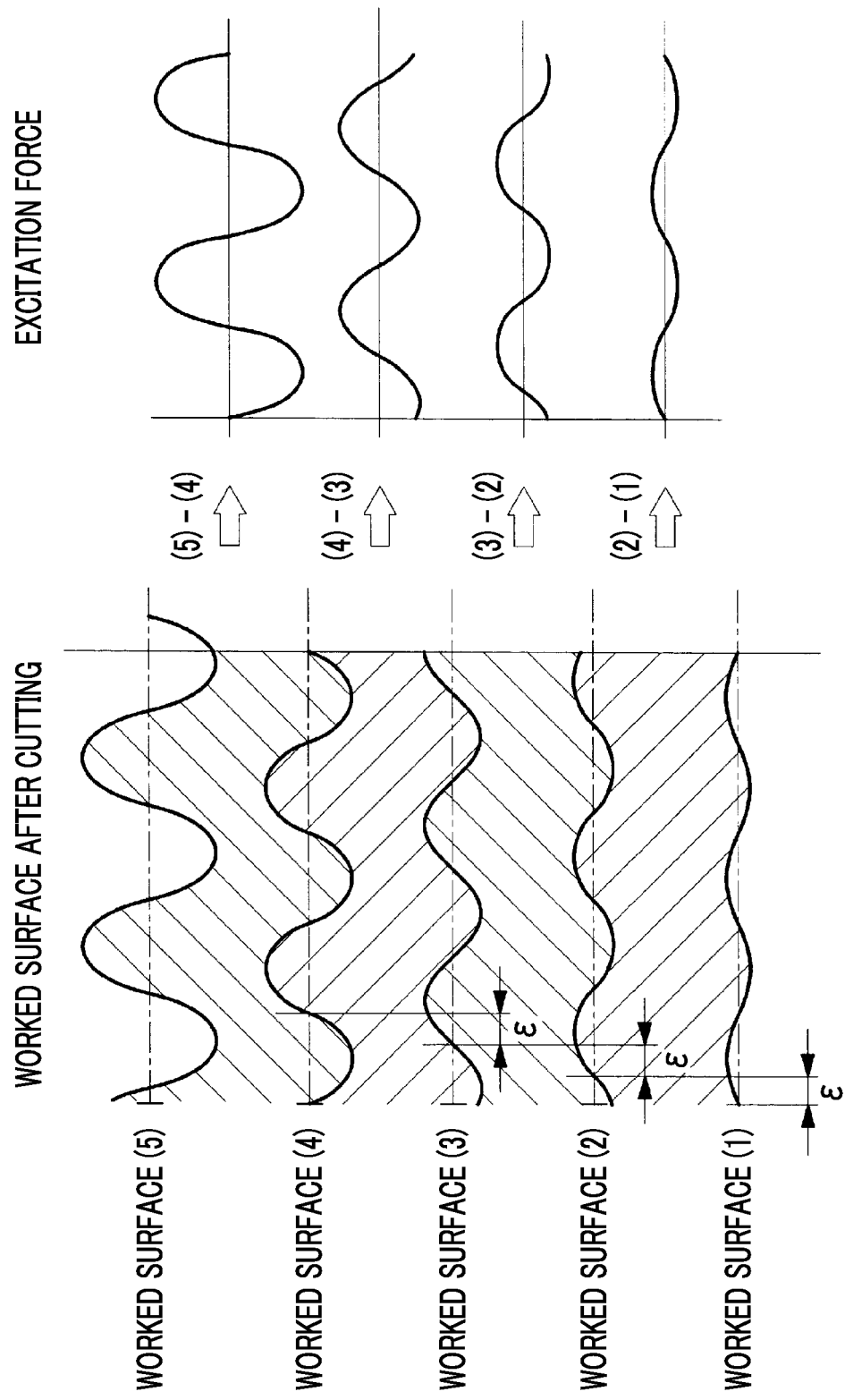
FIG. 4 is a schematic diagram showing the magnitude of an excitation force due to the influence of a phase difference related to the embodiment of the present invention.

In addition, as shown in FIG. 4, if the phase difference is continuously shifted for each worked surface 40 which is successively cut, the phase difference becomes an excitation force, and thus vibration increases each time the cutting of the workpiece 16 is repeated. As a result, working of the workpiece 16 becomes unstable, and thus the worked surface 40 becomes rough or the end mill 18 is damaged.

The phase difference is calculated from Equation (2) below. Further, an integer K is expressed by Equation (3) below. In this manner, in this embodiment, in a case where the phase difference is expressed by an integer and a decimal, only a decimal part is called a phase difference.

[Equation 2]

$$\varepsilon = \frac{fc \times 60}{Z \times n} - \left\lfloor \frac{fc \times 60}{Z \times n} \right\rfloor \quad (2)$$

[Equation 3]

$$K = \left\lfloor \frac{fc \times 60}{Z \times n} \right\rfloor \quad (3)$$

In addition, fc is a chatter frequency [Hz], Z is the number of cutting teeth of the end mill 18, and n is the number of rotations.

Figure 5:
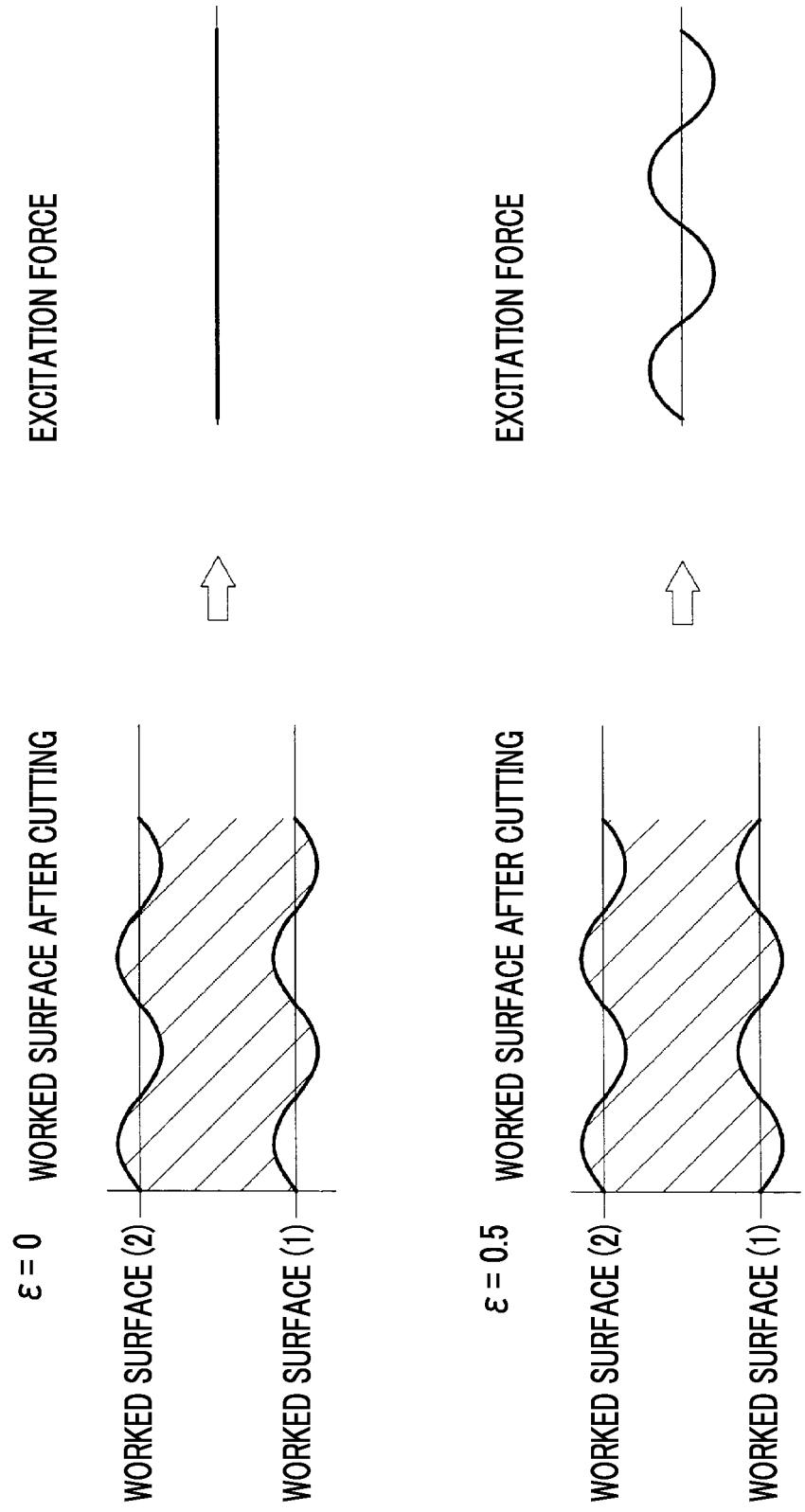
FIG. 5 is a schematic diagram showing the magnitude of an excitation force due to the influence of a phase difference related to the embodiment of the present invention.

In a case where the phase difference ε is 0, there is no phase difference between the worked surface 40_1 and the worked surface 40_2, as shown in FIG. 5, and therefore, an excitation force is not generated. On the other hand, in a case where the phase difference ε is 0.5, the phase difference between the worked surface 40_1 and the worked surface 40_2 becomes the maximum, as shown in FIG. 5, and therefore, an excitation force which is generated also becomes the maximum.

Figure 6:
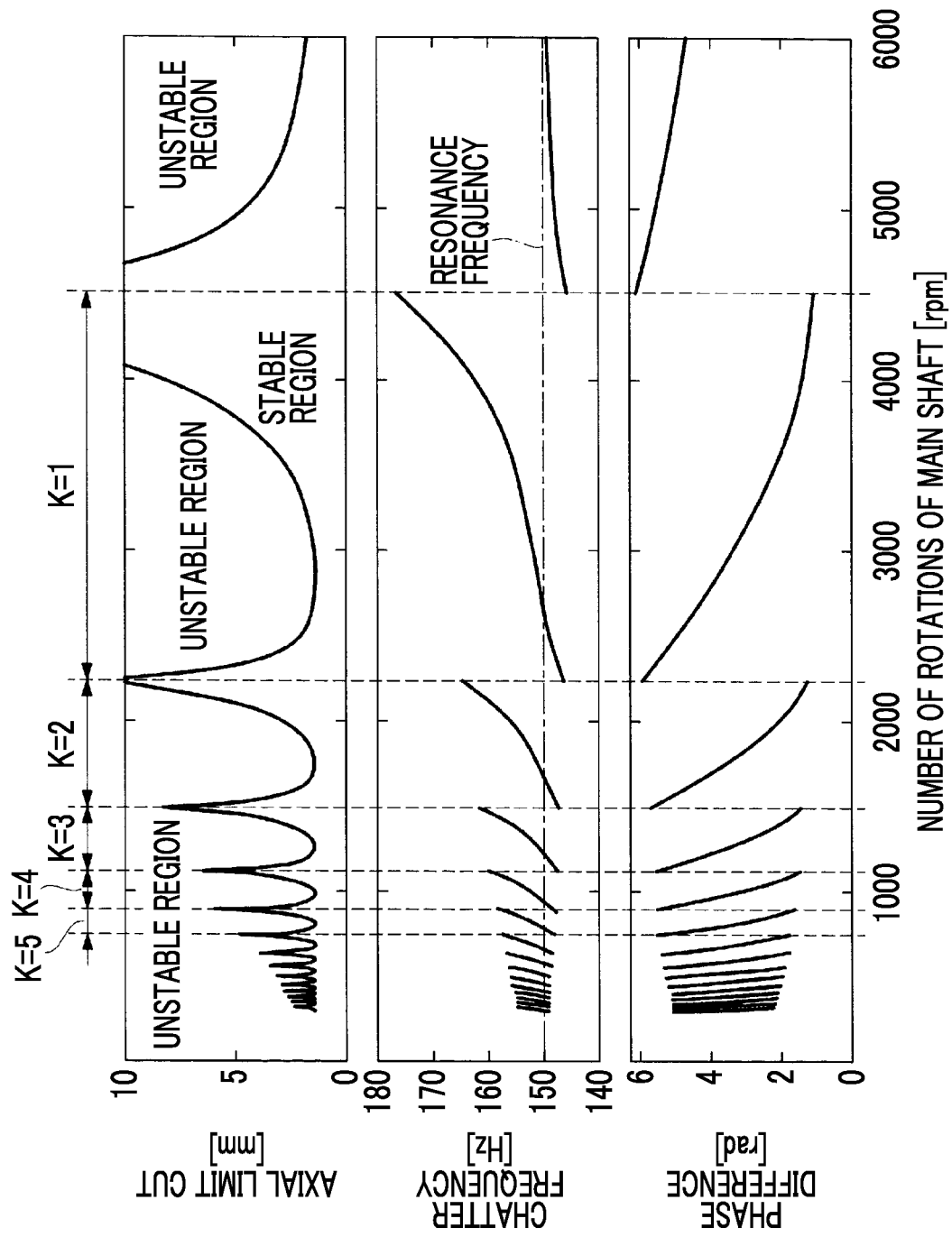
FIG. 6 is a graph showing the number of rotations in which the end mill related to the embodiment of the present invention can perform stable cutting.

FIG. 6 is a graph showing the number of rotations in which the end mill 18 can perform stable cutting.

In FIG. 6, a horizontal axis represents the number of rotations of the end mill 18 (a spindle speed), and a vertical axis represents an axial depth (a stability limit) of the end mill 18 in which stable cutting is possible, a chatter frequency, and a phase difference. In addition, the graph showing the relationship between the number of rotations of the end mill 18 in FIG. 6 and the stability limit is namely a stability limit line diagram.

In the relationship between the number of rotations of the end mill 18 and the stability limit, it shows that stable cutting by the end mill 18 is possible on the lower side of a mountain shape in which the optimum spindle speed (being a dashed line of FIG. 6 and also referred to as a stability limit peak) for each integer K in which the stability limit becomes the maximum is the apex (a stable region). In addition, the optimum spindle speed is the number of rotations which is obtained by substituting a resonance frequency (a natural frequency) fs of the machine tool 10 for the chatter frequency fc of Equation (1). On the other hand, the cutting by the end mill 18 becomes unstable on the upper side of the mountain shape (an unstable region).

Further, in the relationship between the number of rotations of the end mill 18 and the chatter frequency, it shows that for each range of each integer K, the greater the number of rotations, the greater the chatter frequency becomes.

In addition, in the relationship between the number of rotations of the end mill 18 and the phase difference, it can be seen that the more the phase difference is close to 0 or 2π (synonymous with 0 rad or 6.24 rad, ε=0 or 1), the more the number of rotations approaches the optimum spindle speed. For this reason, as the phase difference approaches from 0 to 2π, the stability limit can be made deeper and stable cutting becomes possible.

As described above, depending on the size of the phase difference of the chatter vibration during cutting, stable cutting is hindered. In order to perform stable cutting, it is desirable that the number of rotations of the end mill 18 is close to the optimum spindle speed which is the number of rotations according to the resonance frequency of the entire machine tool 10.

Further, from FIG. 6, it can be seen that there is a correlation between the chatter frequency and the phase difference, such as that the greater the chatter frequency, the smaller the phase difference becomes, and the smaller the chatter frequency, the greater the phase difference becomes.

Therefore, in this embodiment, the chatter frequency is found by detecting sound during the cutting by the end mill 18 by the microphone 24 and performing frequency analysis by the frequency analysis section 28. The number of rotations in which the chatter frequency becomes discontinuous, that is, the optimum spindle speed, is obtained by finding the chatter frequency for every different number of rotations of the end mills 18 and producing a graph showing the relationship between the number of rotations of the end mill 18 and the chatter frequency as shown in FIG. 6.

Figure 7:
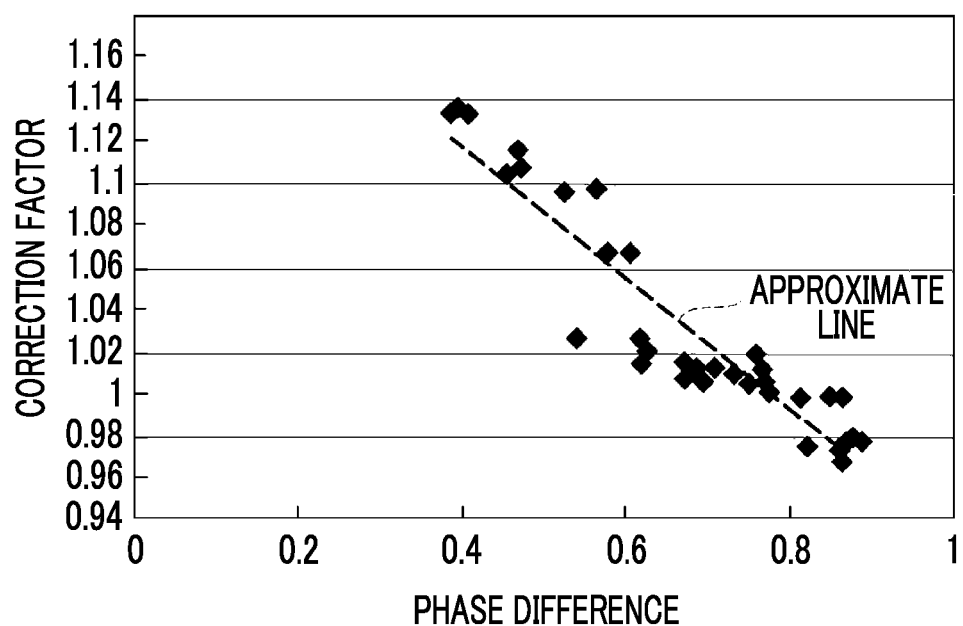
FIG. 7 is a graph showing the relationship between a phase difference correlated with a chatter frequency and a correction factor related to the embodiment of the present invention.

The calculated ratio (fs/fc) between the resonance frequency of the machine tool 10 and the chatter frequency becomes a correction factor for finding the resonance frequency from the phase difference. FIG. 7 is an example of a graph showing the relationship between the phase difference correlated with the chatter frequency and the correction factor. The relationship between the phase difference (the chatter frequency) and the correction factor can be approximated by an approximate line. In this manner, the correction factor changes according to the phase difference, that is, the chatter frequency.

The correction factor is experimentally obtained in advance in the manner described above. In addition, it is preferable that the correction factor is obtained for every different type of the end mill 18. However, a correction factor for a representative type of end mill 18 may be applied to other types of end mill 18.

Equation (4) below is an equation for finding the resonance frequency fs of the machine tool 10 by multiplying the chatter frequency fc by the number of times of correction R according to the chatter frequency fc with the correction factor as R and finding the optimum spindle speed as the number of rotations of the end mill 18 on the basis of the resonance frequency fs.

[Equation 4]

$$n = \frac{fc \times 60}{R \times Z \times K} \quad (4)$$

Figure 8:
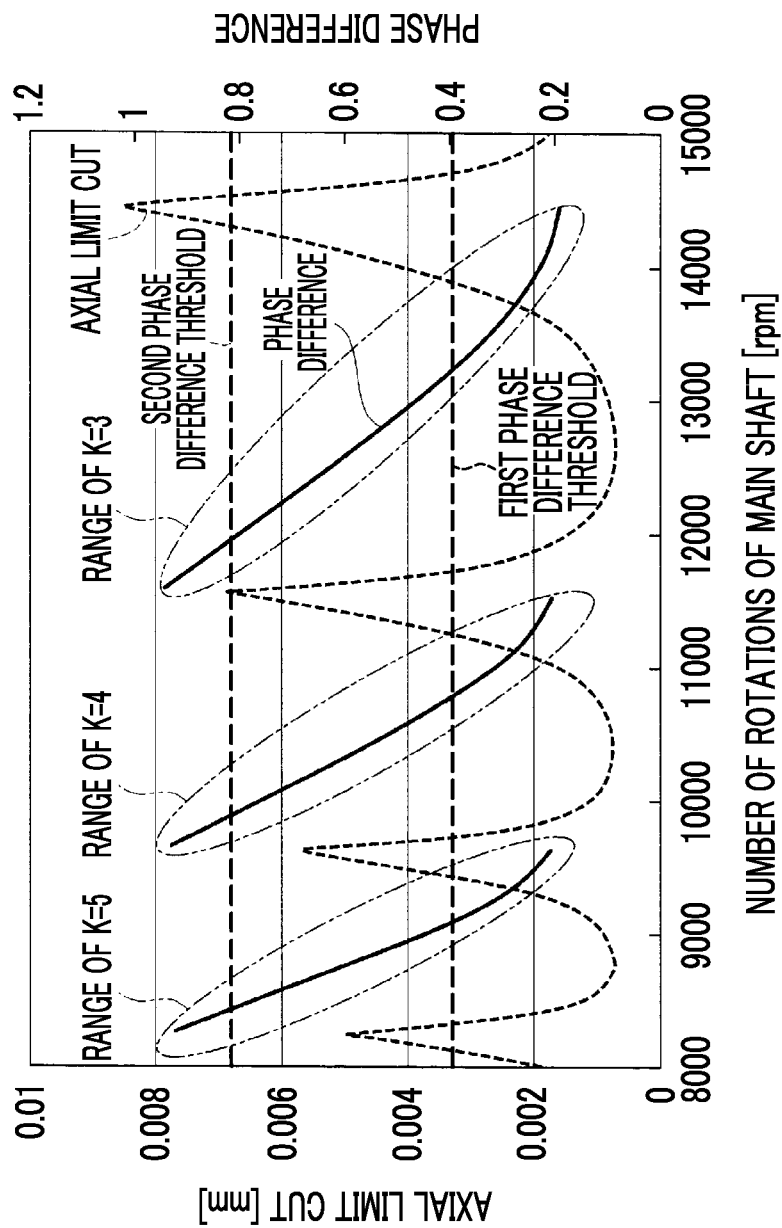
FIG. 8 is a graph showing the relationship between a phase difference and an optimum spindle speed related to the embodiment of the present invention.

FIG. 8 is a graph showing the relationship between the phase difference and the optimum spindle speed. In addition, FIG. 8 is equivalent to a graph in which the relationship between the number of rotations of the end mill 18 and the stability limit and the relationship between the number of rotations and the chatter frequency in FIG. 6 are overlapped.

As shown in FIG. 8, the more a case where the phase difference is small so as to be close to 0 or a case where the phase difference is large so as to be close to 1 ($2\pi$), the more the number of rotations of the end mill 18 is close to the optimum spindle speed, and thus stable cutting becomes possible.

Therefore, in this embodiment, as a threshold for determining whether or not the number of rotations of the end mill 18 is close to the optimum spindle speed, a first phase difference threshold and a second phase difference threshold greater than the first phase difference threshold are set. In a case where the phase difference is smaller than the first phase difference threshold, the number of rotations of the end mill 18 is increased by a first predetermined number. Further, in a case where the phase difference is greater than the second phase difference threshold, the number of rotations of the end mill 18 is decreased by a second predetermined number.

A case where the phase difference is smaller than the first phase difference threshold is a case where the phase difference is close to 0, and the number of rotations of the end mill 18 is increased, thereby becoming close to the optimum spindle speed. In contrast, a case where the phase difference is greater than the second phase difference threshold is a case where the phase difference is close to 1, and the number of rotations of the end mill 18 is decreased, thereby becoming close to the optimum spindle speed.

In addition, the first predetermined number and the second predetermined number may be the same value or may be different values, and in this embodiment, as an example, both the first predetermined number and the second predetermined number are set to be 2% of the previous number of rotations.

Further, if the integer part of the phase difference which is obtained from Equation (3) is different, the minimum value and the maximum value of the decimal part of the phase difference are also different. For this reason, in this embodiment, the first phase difference threshold and the second phase difference threshold are set to be different values for each integer part of the phase difference.

Table 1 below is an example of a range of the phase difference which is different according to the integer K.

TABLE 1

| K value | Phase difference minimum value | Phase difference maximum value |
| --- | --- | --- |
| 3 | 0.35 | 0.90 |
| 4 | 0.41 | 0.88 |
| 5 | 0.46 | 0.88 |
| 6 | 0.52 | 0.87 |
| 7 | 0.57 | 0.87 |
| 8 | 0.59 | 0.86 |
| 9 | 0.63 | 0.86 |

Then, in this embodiment, as shown in Table 2 below, as an example, the first phase difference threshold according to each integer K is set to be +0.1 of the phase difference minimum value, and the second phase difference threshold according to each integer K is set to be −0.1 of the phase difference maximum value.

TABLE 2

| K value | First phase difference threshold | Second phase difference threshold |
| --- | --- | --- |
| 3 | 0.45 | 0.80 |
| 4 | 0.51 | 0.78 |
| 5 | 0.56 | 0.78 |
| 6 | 0.62 | 0.77 |
| 7 | 0.67 | 0.77 |
| 8 | 0.69 | 0.76 |
| 9 | 0.73 | 0.76 |

In addition, the phase difference minimum value and the phase difference maximum value for each integer K can be theoretically obtained by using a transfer function obtained by performing a hammering test on the end mill 18 (refer to, for example, a literature "Eiji Shamoto, Generation mechanism and suppression of chatter vibration in cutting, Daido Steel Technical Report, Japan, Daido Steel Co., Ltd., Dec. 27, 2011, Vol. 82, No. 2, p. 143 to p. 155").

In an example of a specific calculation method, a transfer function of the tip of the end mill 18 is obtained by a hammering test, a cutting resistance matrix is obtained on the basis of Equation (14) of the above-mentioned literature, the eigenvalue of a value obtained by multiplying the transfer function by the cutting resistance matrix is obtained on the basis of Equation (20) of the above-mentioned literature, and the phase difference minimum value and the phase difference maximum value according to the integer K are obtained from the eigenvalue on the basis of Equations (24) and (25) of the above-mentioned literature.

Figure 9:
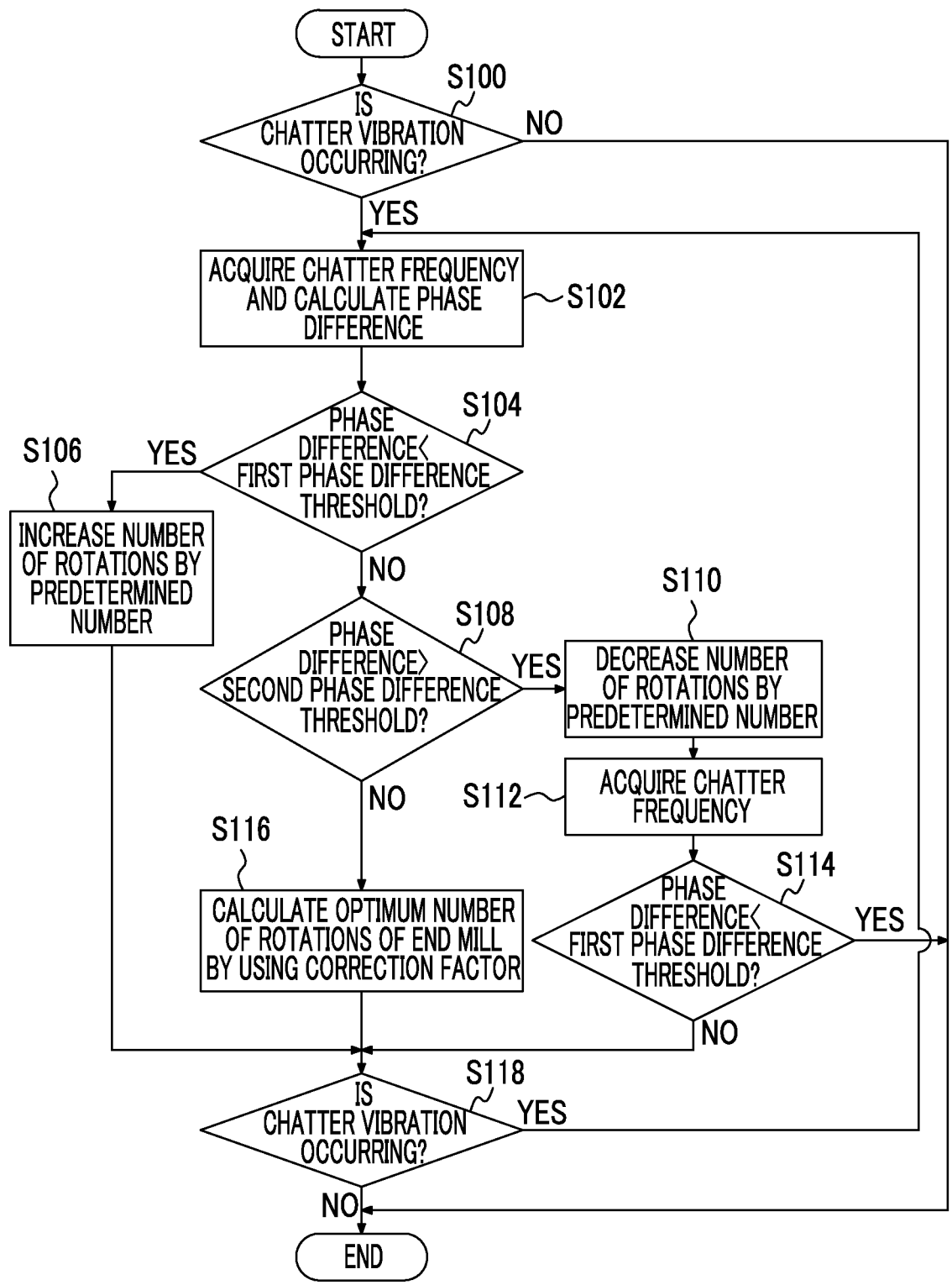
FIG. 9 is a flowchart showing the flow of spindle speed control processing related to the embodiment of the present invention.

FIG. 9 is a flowchart showing the flow of spindle speed control processing (a spindle speed control program) of the end mill 18 related to this embodiment. The spindle speed control processing is executed by the NC unit 14 simultaneously with the start of the cutting of the workpiece 16 by the NC machine tool 12. As the spindle speed control program, a form which is previously installed in a storage medium (not shown) with which the NC unit 14 is provided, a form which is provided in a state of being stored in a computer-readable storage medium, a form which is delivered through wired or wireless communication means, or the like can be applied.

First, in step 100, the chatter vibration determination section 30 determines whether or not the chatter vibration is occurring due to cutting. Specifically, the frequency analysis section 28 performs frequency analysis of sound detected by the microphone 24, and the chatter vibration determination section 30 determines whether or not the frequency is in a range of a chatter frequency.

In a case where an affirmative determination is made in step 100, the routine proceeds to step 102, and in a case where a negative determination is made, this spindle speed control processing is ended. That is, in the case of a negative determination, since the number of rotations of the end mills 18 is the number of rotations which does not cause the chatter vibration, the number of rotations is maintained and the cutting is continued.

In the next step 102, the chatter vibration determination section 30 acquires a chatter frequency on the basis of the sound detected by the microphone 24 and calculates a phase difference from the chatter frequency.

In the next step 104, the optimum spindle speed calculation section 32 determines whether or not the phase difference is smaller than the first phase difference threshold, and in the case of an affirmative determination, the routine proceeds to step 106, and in the case of a negative determination, the routine proceeds to step 108.

In step 106, the optimum spindle speed calculation section 32 increases the number of rotations by a predetermined number, and the rotation control section 34 outputs a control signal indicating the increased number of rotations to the NC panel 26 and the routine then proceeds to step 118. The NC panel 26 rotates the end mill 18 at the number of rotations which is indicated by the input control signal, thereby continuing the cutting of the workpiece 16.

In step 108, the optimum spindle speed calculation section 32 determines whether or not the phase difference is greater than the second phase difference threshold, and in the case of an affirmative determination, the routine proceeds to step 110, and in the case of a negative determination, the routine proceeds to step 116.

In step 110, the optimum spindle speed calculation section 32 decreases the number of rotations by a predetermined number, and the rotation control section 34 outputs a control signal indicating the decreased number of rotations to the NC panel 26, and the routine then proceeds to step 112. The NC panel 26 rotates the end mill 18 at the number of rotations which is indicated by the input control signal, thereby continuing the cutting of the workpiece 16.

In the next step 112, the chatter vibration determination section 30 acquires a chatter frequency on the basis of the sound detected by the microphone 24 and calculates a phase difference from the chatter frequency.

In the next step 114, the optimum spindle speed calculation section 32 determines whether or not the phase difference is smaller than the first phase difference threshold, and in the case of an affirmative determination, the number of rotations of the end mill 18 is fixed and the spindle speed control processing is ended, and in the case of a negative determination, the routine proceeds to step 118.

Here, the processing of step 114 will be described in detail.

A case where an affirmative determination is made in step 114 is a case where the number of rotations of the end mill 18 is greater than the second phase difference threshold and thus the number of rotations of the end mill 18 is decreased by a predetermined number, and as a result, the number of rotations of the end mill 18 has become smaller than the first phase difference threshold.

A case where the number of rotations of the end mill 18 becomes smaller than the first phase difference threshold after the number of rotations of the end mill 18 is decreased by a predetermined number is a case where the integer part of the phase difference changes so as to change from integer K=3 to integer K=4 shown in FIG. 8, for example, and a case where the number of rotations in which chatter vibration does not occur for a reason such as a cut to the workpiece 16 being too large does not exist. In such a case, if the phase difference becomes smaller than the first phase difference threshold and the number of rotations of the end mill 18 is increased by a predetermined number again, the integer part of the phase difference changes again, and thus the phase difference becomes greater than the second phase difference threshold, and in this manner, the number of rotations is frequently switched, and therefore, there is a possibility that control may become unstable.

Figure 10:
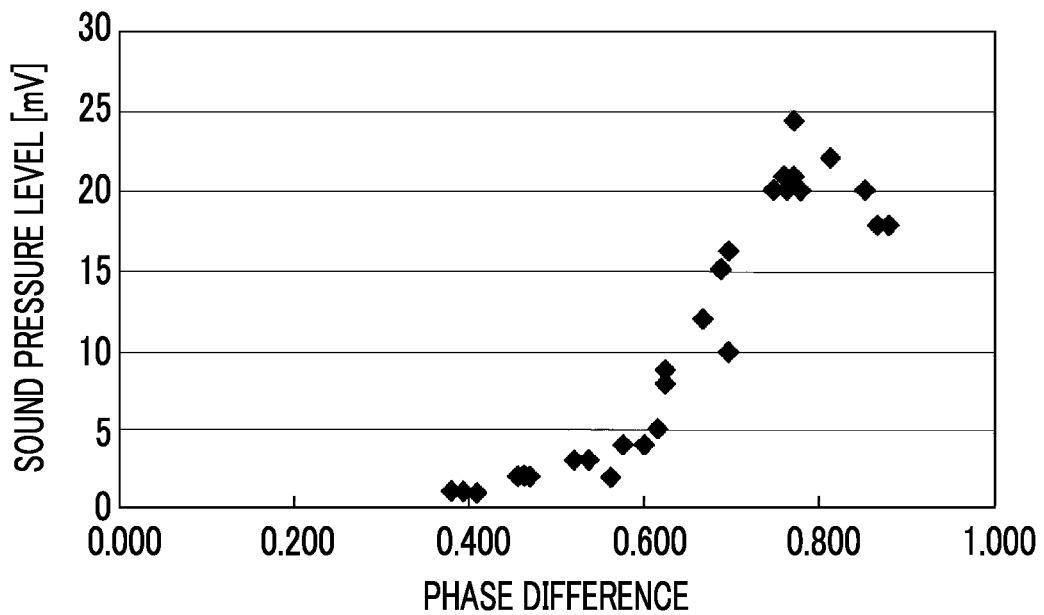
FIG. 10 is a graph showing the relationship between a phase difference and a sound pressure level related to the embodiment of the present invention.
Figure 11:
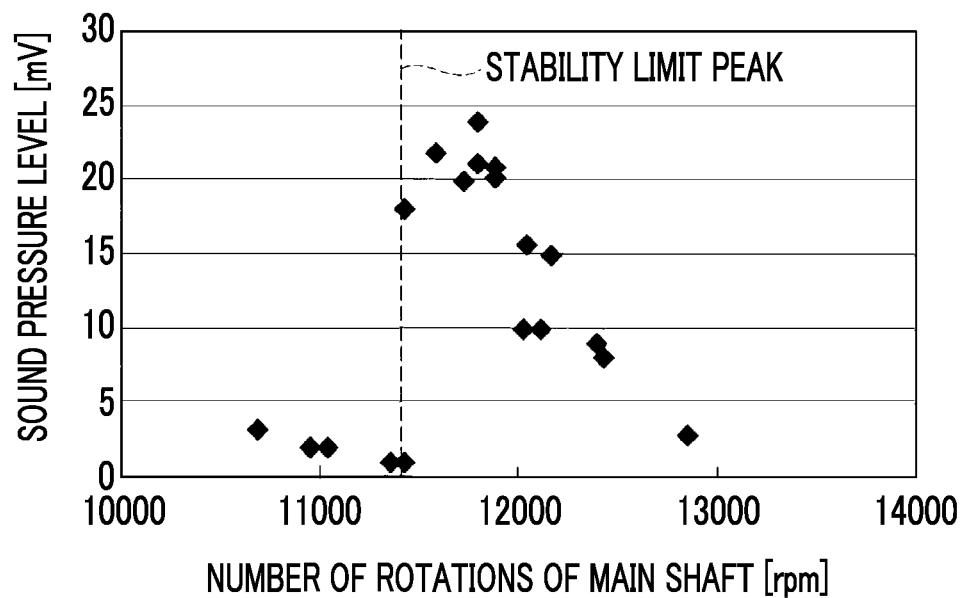
FIG. 11 is a graph showing the relationship between the number of rotations of the end mill related to the embodiment of the present invention and a sound pressure level.

Further, as shown in the relationship between a phase difference and a sound pressure level of FIG. 10, the smaller the phase difference, the smaller the sound pressure level due to the chatter vibration, and the chatter vibration is small. Then, as shown in the relationship between the number of rotations of the end mill 18 and the sound pressure level of FIG. 11, the lower the number of rotations across the optimum spindle speed which is a stability limit peak, the lower the sound pressure level. For this reason, it can be seen that it is preferable that the phase difference is small.

For this reason, in a case where an affirmative determination is made in step 114, the cutting of the workpiece 16 is continued with the fixed number of rotations without decreasing the number of rotations to be smaller than the first phase difference threshold.

On the other hand, a case where a negative determination is made in step 108 is a case where the phase difference is greater than the first phase difference threshold and smaller than the second phase difference threshold, that is, the number of rotations of the end mill 18 has become the number of rotations away from the optimum spindle speed.

Therefore, in step 116, the optimum spindle speed calculation section 32 calculates the optimum spindle speed of the end mill 18 by Equation (4) using the correction factor and the rotation control section 34 outputs a control signal indication the calculated optimum spindle speed to the NC panel 26, and the routine then proceeds to step 118. The NC panel 26 changes the speed of the end mill 18 so as to become the number of rotations which is indicated by the input control signal, and then continues the cutting of the workpiece 16. In this way, the number of rotations of the end mill 18 approaches the optimum spindle speed.

In step 118, the chatter vibration determination section 30 determines whether or not the chatter vibration is occurring due to the cutting, and in the case of an affirmative determination, the routine returns to step 102, whereby the optimization of the number of rotations of the end mill 18 is repeated, and in the case of a negative determination, the spindle speed control processing is ended, and the cutting of the workpiece 16 is continued with the number of rotations of the end mill 18 fixed.

As described above, the NC unit 14 of the machine tool 10 related to this embodiment calculates the phase difference of the chatter vibration during cutting on the basis of the detection result of sound which is generated by the cutting of the workpiece 16 by the end mill 18, and increases the number of rotations of the end mill 18 by a predetermined number in a case where the phase difference is smaller than the first phase difference threshold, and decreases the number of rotations of the end mill 18 by a predetermined number in a case where the phase difference is greater than the second phase difference threshold. Further, in a case where the phase difference is between the first phase difference threshold and the second phase difference threshold, the NC unit 14 finds the resonance frequency of the machine tool 10 by multiplying a chatter frequency by a correction factor that changes according to the chatter frequency, and calculates the number of rotations of the end mill 18 on the basis of the resonance frequency.

Therefore, the NC unit 14 enables stable cutting with suppressed chatter vibration when cutting the workpiece 16 by the rotation of the end mill 18.

The present invention has been described above by using the above-described embodiment. However, the technical scope of the present invention is not limited to the scope described in the above-described embodiment. Various modifications or improvements can be applied to the above-described embodiment within a scope which does not depart from the gist of the invention, and forms with the modifications or the improvements applied thereto are also included in the technical scope of the present invention.

For example, in the above-described embodiment, a form in which the correction factor is obtained on the basis of the chatter frequency and the phase difference having a correlation with each other has been described. However, the present invention is not limited thereto, and a form is also acceptable in which a correction factor that changes according to a sound pressure level is obtained on the basis of the sound pressure level and the phase difference having a correlation with each other, as shown in FIG. 10.

Figure 12:
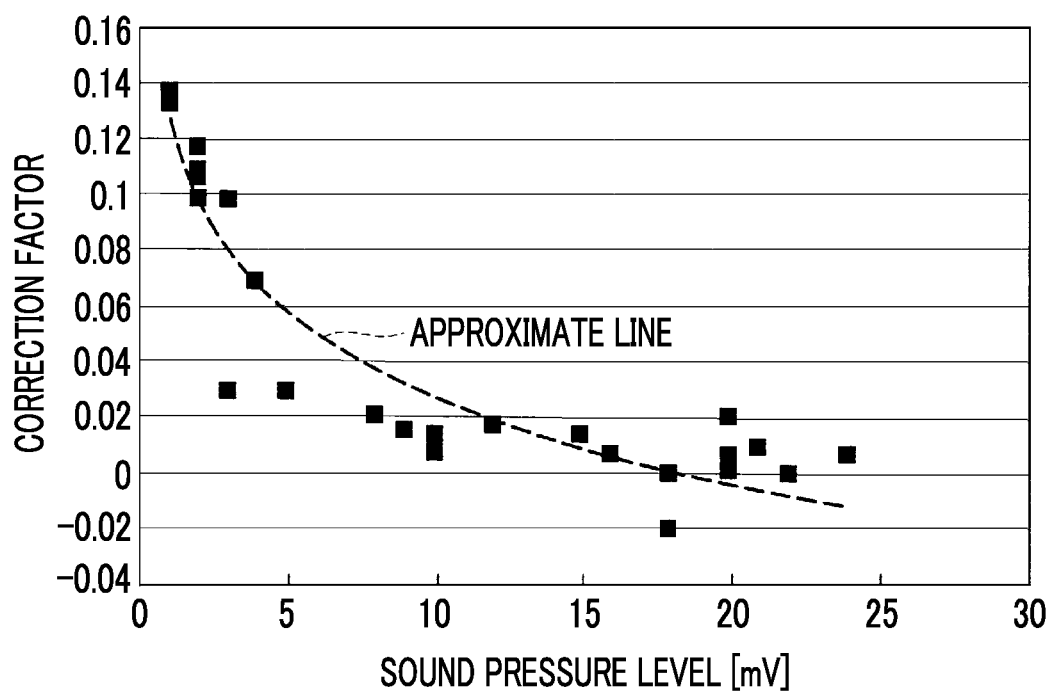
FIG. 12 is a graph showing the relationship between a sound pressure level and a correction factor related to the embodiment of the present invention.

FIG. 12 is a graph showing the relationship between the sound pressure level and the correction factor. As shown in FIG. 12, the correction factor can also be calculated from the sound pressure level by an approximation formula.

Further, the flow of the spindle speed control processing described in the above-described embodiment is also an example, and an unnecessary step may be deleted, a new step may be added, or the processing order may be changed, within a scope which does not depart from the gist of the present invention.

For example, in the above-described embodiment, a form in which the first phase difference threshold and the second phase difference threshold are set as a threshold for determining whether or not the number of rotations of the end mill 18 is close to the optimum spindle speed has been described. However, the present invention is not limited thereto, and a form in which only one threshold is set is also acceptable.

In the case of this form, for example, the median of the range of the phase difference for each integer K is set to be a threshold, and in a case where the phase difference is smaller than the threshold, the number of rotations of the end mill 18 is increased by a predetermined number, and in a case where the phase difference is greater than the threshold, the number of rotations of the end mill 18 is decreased by a predetermined number. In addition, in the case of this form, the calculation of the number of rotations and the change of speed of the end mill 18 using the correction factor as in step 116 are not performed.

Further, in the above-described embodiment, a form in which the number of rotations of the end mill 18 is calculated by Equation (4) using the correction factor in step 116 has been described. However, the present invention is not limited thereto, and a form is also acceptable in which the number of rotations of the end mill 18 is calculated by Equation (1) using the chatter frequency fc without using the correction factor.

REFERENCE SIGNS LIST

10: machine tool
14: NC unit
16: workpiece
18: end mill
24: microphone
30: chatter vibration determination section
32: optimum spindle speed calculation section
34: rotation control section

The invention claimed is:

1. An NC unit for a machine tool that works a workpiece by rotation of a tool, comprising:
   a vibration detection unit configured to detect vibration which is generated by working of the workpiece;
   an acquisition unit configured to acquire a phase difference between chatter vibration during previous time working and chatter vibration during this time working and a chatter frequency, on the basis of a detection result of the vibration by the vibration detection unit;
   a spindle speed calculation unit configured to find a resonance frequency of the machine tool by multiplying the chatter frequency by a correction factor that has a correlation with the phase difference between chatter vibration during previous time working and chatter vibration during this time working, and calculating the number of rotations of the tool on the basis of the resonance frequency; and
   a spindle speed control unit for rotating the tool at a spindle speed calculated by the spindle speed calculation unit,
   wherein the spindle speed calculation unit calculates the number of rotations of the tool by increasing the number of rotations of the tool by a first predetermined number in a case where the phase difference is smaller than a predetermined first threshold, decreasing the number of rotations of the tool by a second predetermined number in a case where the phase difference is greater than a second threshold greater than the first threshold, and multiplying the chatter frequency by the correction factor in a case where the phase difference is between the first threshold and the second threshold.

2. The NC unit for a machine tool according to claim 1, wherein the vibration detection unit is a sound detection unit configured to detect sound which is generated by the working of the workpiece, or an acceleration detection unit configured to detect rotational acceleration of the tool.

3. The NC unit for a machine tool according to claim 2, wherein the detection result of the sound by the sound detection unit is a frequency or a sound pressure level of the sound.

4. The machine tool comprising:
   a tool that works the workpiece by rotation; and
   the NC unit according to claim 1.

5. An NC unit for a machine tool that works a workpiece by rotation of a tool, comprising:
   a vibration detection unit configured to detect vibration which is generated by working of the workpiece;

a phase difference calculation unit configured to calculate a phase difference of chatter vibration during working on the basis of a detection result of the vibration by the vibration detection unit;
a spindle speed calculation unit configured to bring a number of rotations of the tool closer to the number of rotations according to a resonance frequency of the machine tool by increasing the number of rotations of the tool by a first predetermined number in a case where the phase difference calculated by the phase difference calculation unit is smaller than a first threshold set with a first predetermined margin added to a phase difference minimum value and decreasing the number of rotations of the tool by a second predetermined number in a case where the phase difference is greater than a second threshold set with a second predetermined margin subtracted from a phase difference maximum value; and
a spindle speed control unit configured to rotate the tool at a spindle speed calculated by the spindle speed calculation unit,
wherein the first threshold is set for each integer part of the phase difference on the basis of the phase difference minimum value corresponding to each integer part of the phase difference,
the second threshold is set for each integer part of the phase difference on the basis of the phase difference maximum value corresponding to each integer part of the phase difference, and
the phase difference is a value expressed as a ratio with respect to $2\pi$ rad.

6. The NC unit for a machine tool according to claim 5, wherein the spindle speed calculation unit maintains the number of rotations of the tool without increasing the number of rotations of the tool by the first predetermined number in a case where the phase difference of the tool is greater than the second threshold and thus the number of rotations of the tool is decreased by the second predetermined number, and as a result, the phase difference of the tool has become smaller than the first threshold.

7. A non-transitory computer-readable storage medium storing a control program for a machine tool that works a workpiece by rotation of a tool provided with a vibration detection unit configured to detect vibration which is generated by working of the workpiece,
wherein the control program causes a computer to operate the machine tool, and
the machine tool comprises:
an acquisition unit configured to acquire a phase difference between chatter vibration during previous time working and chatter vibration during this time working and a chatter frequency, on the basis of a detection result of the vibration by the vibration detection unit, and
a spindle speed calculation unit configured to find a resonance frequency of the machine tool by multiplying the chatter frequency by a correction factor that has a correlation with the phase difference between chatter vibration during previous time working and chatter vibration during this time working, and calculating the number of rotations of the tool on the basis of the resonance frequency, and
the spindle speed calculation unit calculates the number of rotations of the tool by increasing the number of rotations of the tool by a first predetermined number in a case where the phase difference is smaller than a predetermined first threshold, decreasing the number of rotations of the tool by a second predetermined number in a case where the phase difference is greater than a second threshold greater than the first threshold, and multiplying the chatter frequency by the correction factor in a case where the phase difference is between the first threshold and the second threshold.

8. A non-transitory computer-readable storage medium storing a control program for a machine tool that works a workpiece by rotation of a tool provided with a vibration detection unit configured to detect vibration which is generated by working of the workpiece,
wherein the control program causes a computer to operate the machine tool, and
the machine tool comprises:
a phase difference calculation unit configured to calculate a phase difference of chatter vibration during working on the basis of a detection result of the vibration by the vibration detection unit, and
a spindle speed calculation unit configured to bring the number of rotations of the tool closer to the number of rotations according to a resonance frequency of the machine tool by increasing the number of rotations of the tool by a first predetermined number in a case where the phase difference calculated by the phase difference calculation unit is smaller than a first threshold set with a first predetermined margin added to a phase difference minimum value and decreasing the number of rotations of the tool by a second predetermined number in a case where the phase difference is greater than a second threshold set with a second predetermined margin subtracted from a phase difference maximum value, and
the first threshold is set for each integer part of the phase difference on the basis of the phase difference minimum value corresponding to each integer part of the phase difference,
the second threshold is set for each integer part of the phase difference on the basis of the phase difference maximum value corresponding to each integer part of the phase difference, and
the phase difference is a value expressed as a ratio with respect to $2\pi$ rad.

9. A control method for a machine tool that works a workpiece by rotation of a tool, comprising:
a first process of detecting vibration which is generated by working of the workpiece;
a second process of acquiring a phase difference between chatter vibration during previous time working and chatter vibration during this time working and a chatter frequency, on the basis of a detection result of the vibration;
a third process of finding a resonance frequency of the machine tool by multiplying the chatter frequency by a correction factor that has a correlation with the phase difference between chatter vibration during previous time working and chatter vibration during this time working, and calculating the number of rotations of the tool on the basis of the resonance frequency; and
a fourth process of rotating the tool at the calculated number of rotations,
wherein in the third process, the number of rotations of the tool is calculated by increasing the number of rotations of the tool by a first predetermined number in a case where the phase difference is smaller than a predetermined first threshold, decreasing the number of rotations of the tool by a second predetermined number in a case where the phase difference is greater than a second threshold greater than the first threshold, and multiplying the chatter frequency by the correction factor in a case where the phase difference is between the first threshold and the second threshold.

10. A control method for a machine tool that works a workpiece by rotation of a tool, comprising:
   a first process of detecting vibration which is generated by working of the workpiece;
   a second process of calculating a phase difference of chatter vibration during working on the basis of a detection result of the vibration;
   a third process of bringing the number of rotations of the tool closer to the number of rotations according to a resonance frequency of the machine tool by increasing the number of rotations of the tool by a first predetermined number in a case where the calculated phase difference is smaller than a first predetermined threshold set with a first predetermined margin added to a phase difference minimum value and decreasing the number of rotations of the tool by a second predetermined number in a case where the phase difference is greater than a second threshold set with a second predetermined margin subtracted from a phase difference maximum value; and
   a fourth process of rotating the tool at the calculated number of rotations,
   wherein the first threshold is set for each integer part of the phase difference on the basis of the phase difference minimum value corresponding to each integer part of the phase difference,
   the second threshold is set for each integer part of the phase difference on the basis of the phase difference maximum value corresponding to each integer part of the phase difference, and
   the phase difference is a value expressed as a ratio with respect to $2\pi$ rad.

11. A working method of working a workpiece by rotation of a tool, comprising:
   a first process of detecting vibration which is generated by working of the workpiece;
   a second process of acquiring a phase difference between chatter vibration during previous time working and chatter vibration during this time working and a chatter frequency, on the basis of a detection result of the vibration;
   a third process of finding a resonance frequency of a machine tool by multiplying the chatter frequency by a correction factor that has a correlation with the phase difference between chatter vibration during previous time working and chatter vibration during this time working, and calculating the number of rotations of the tool on the basis of the resonance frequency; and
   a fourth process of working the workpiece by rotating the tool at the calculated number of rotations,
   wherein in the third process, the number of rotations of the tool is calculated by increasing the number of rotations of the tool by a first predetermined number in a case where the phase difference is smaller than a predetermined first threshold, decreasing the number of rotations of the tool by a second predetermined number in a case where the phase difference is greater than a second threshold greater than the first threshold, and multiplying the chatter frequency by the correction factor in a case where the phase difference is between the first threshold and the second threshold.

12. A working method of working a workpiece by rotation of a tool, comprising:
   a first process of detecting vibration which is generated by working of the workpiece;
   a second process of calculating a phase difference of chatter vibration during working on the basis of a detection result of the vibration;
   a third process of bringing the number of rotations of the tool closer to the number of rotations according to a resonance frequency of the machine tool by increasing the number of rotations of the tool by a first predetermined number in a case where the calculated phase difference is smaller than a first predetermined threshold set with a first predetermined margin added to a phase difference minimum value and decreasing the number of rotations of the tool by a second predetermined number in a case where the phase difference is greater than a second threshold set with a second predetermined margin subtracted from a phase difference maximum value; and
   a fourth process of working the workpiece by rotating the tool at the calculated number of rotations,
   wherein the first threshold is set for each integer part of the phase difference on the basis of the phase difference minimum value corresponding to each integer part of the phase difference,
   the second threshold is set for each integer part of the phase difference on the basis of the phase difference maximum value corresponding to each integer part of the phase difference, and
   the phase difference is a value expressed as a ratio with respect to $2\pi$ rad.

* * * * *